US010077853B2

(12) United States Patent
McDonald (10) Patent No.: US 10,077,853 B2
(45) Date of Patent: Sep. 18, 2018

(54) HOSE CARRIER

(71) Applicant: Dustin McDonald, Hiram, GA (US)

(72) Inventor: Dustin McDonald, Hiram, GA (US)

( * ) Notice: Subject to any disclaimer, the term of this patent is extended or adjusted under 35 U.S.C. 154(b) by 0 days.

(21) Appl. No.: 15/784,115

(22) Filed: Oct. 14, 2017

(65) Prior Publication Data
US 2018/0119847 A1 May 3, 2018

Related U.S. Application Data

(60) Provisional application No. 62/414,350, filed on Oct. 28, 2016.

(51) Int. Cl.
*F16L 3/22* (2006.01)
*F16L 3/18* (2006.01)
*F16L 3/12* (2006.01)

(52) U.S. Cl.
CPC ............... *F16L 3/18* (2013.01); *F16L 3/1218* (2013.01)

(58) Field of Classification Search
CPC ................................. F16L 3/18; F16L 3/1218
USPC ............... 248/76, 65, 68.1, 73, 75; 138/106; 174/68.1
See application file for complete search history.

(56) References Cited

U.S. PATENT DOCUMENTS

| 3,414,220 A * | 12/1968 | Walker | F16L 3/2235 248/68.1 |
| 5,992,802 A * | 11/1999 | Campbell | H02G 3/30 248/68.1 |
| 9,909,692 B2 * | 3/2018 | Dean | F16L 3/1211 |
| 2014/0007402 A1 * | 1/2014 | Boyer | H02G 3/32 29/428 |

* cited by examiner

*Primary Examiner* — Todd M Epps
(74) *Attorney, Agent, or Firm* — Lamon Patent Services; Cynthia S. Lamon (57) ABSTRACT

A compound roller assembly is provided for carrying a hose reducing friction of hoses on various surfaces. The roller assembly comprises a primary roller assembly comprising a first frame element, a central channel with a channel axis, an opening allowing placement over the hose or conduit. Appendages extend from the frame element radially outward. A plurality of axle rods are engaged with the appendages, enabling the rollers to roll on the axle rods. A secondary roller assembly, identical to the primary roller assembly, placed over the hose or conduit with the secondary roller assembly rotated around the central axis, the second end of the primary roller assembly joining by a mechanical interface securely to a compatible mechanical interface, to the first end of the secondary roller assembly, such that the compound roller assembly encompasses the hose.

16 Claims, 6 Drawing Sheets

HOSE CARRIER

CROSS-REFERENCE TO RELATED APPLICATIONS

The present application claims priority to a provisional patent application 62/414,350, filed Oct. 28, 2016, and all disclosure of the parent application is incorporated herein at least by reference.

BACKGROUND OF THE INVENTION

1. Field of the Invention

The present invention is the technical area of mechanical devices for reducing friction, and pertains more particularly to a device for reducing friction and drag for hoses and other conduits, when moving such conduits over supporting surfaces.

2. Description of Related Art

It is well known in the art that there are many pressing needs for moving and relocating hoses and other conduits in many different circumstances. Hoses in gardening and landscaping applications, for example, typically must be connected at a head end to a hose spike, or other source of water, and must be moved to a point of application that may be quite remote from the source. Further, a hose may need to be moved frequently to other points of application, such as to water specific plants. As another example, heavy hoses in firefighting applications need to connect at a source end, and must be moved to point of application for firefighting such as brush fires and structure fires. Ability to move and relocate hoses is critical to success in fighting a fire of any sort.

There exists, at the time of filing the present application, no specific solution for the problem of moving hoses and other conduits over ground or structural surfaces other than just picking up the hose, or a portion of the hose and carry it to a different location. Therefore, what is clearly needed is a device or implement that may pair with a hose or conduit in a plurality of positions, providing rollers between the hose or conduit and surfaces upon which the hose may travel.

BRIEF SUMMARY OF THE INVENTION

A compound roller assembly is provided for carrying a hose having a first diameter. The compound roller includes a primary roller assembly comprising a first frame element having a length between a first and a second end. A central channel is provided in this embodiment with a channel axis, the central channel of a diameter equal to or larger than the first diameter to enclose a portion of the hose or conduit. The central channel also has an opening of a width at least equal to the first diameter and extending to one side allowing placement over the hose or conduit with the channel axis in the direction of an axis of the hose or conduit.

Appendages extending from the frame element radially outward from the first frame element are included in this embodiment. A plurality of axle rods are engaged with the appendages. The axle rods may have axes at right angles to the channel axis, and rollers include central bores engaged with the axle rods, enabling the rollers to roll on the axle rods.

A secondary roller assembly identical to the primary roller assembly except for position and orientation may also be provided in this embodiment. The secondary roller assembly placed over the hose or conduit with the secondary roller assembly rotated around the central axis, extending the opening from the central channel in a direction other than the direction of the first opening. The second end of the primary roller assembly may be joined securely by a mechanical interface to a compatible mechanical interface to the first end of the secondary roller assembly, such that the compound roller assembly encompasses the hose. In one embodiment, the rollers are polymer rollers having a conical shape in a length-wise cross-section.

In one embodiment the compound roller assembly provides that the first end is a female end and the second end is a male end. The female end has an inside diameter to accept an outside diameter of the male end up to a shoulder in the female end. In this embodiment the mechanical interfaces may comprise one or more pins extending radially from the outside diameter of the male end. Locking grooves may be implemented in the female end to accept the pins and to lock with a rotary motion engaging the pins in the grooves.

Another embodiment includes a gasket having a central channel of a diameter over the hose between the second end of the primary roller assembly and the first end of the secondary roller assembly. The gasket is made of a material enabling depression in assembly, urging the primary and secondary roller assemblies apart, thereby securing locking of the pins in the grooves. In an alternative embodiment the gasket has a central channel with a channel axis, the central channel of a diameter equal to or larger than the first diameter to enclose a portion of the hose. The central channel includes an opening of a width at least equal to the first diameter and extending to one side, allowing placement over the hose or conduit with the channel axis in the direction of an axis of the hose or conduit. An addition to this embodiment includes that the gasket is formed with a plurality of inward-extending appendages from the central channel, gripping the hose, and enabling the compound roller assembly to be applied to hoses of different diameters.

In an alternative or inclusive embodiment, a tertiary roller assembly is added that is identical to the primary and secondary roller assemblies. The tertiary roller assembly is placed over the hose or conduit with the tertiary roller assembly engaging the hose in the same aspect as the primary roller assembly. The first end of the tertiary roller assembly may be securely joined by a mechanical interface to a compatible mechanical interface to the second end of the secondary roller assembly, such that the compound roller assembly encompasses the hose, providing a compound roller assembly comprising three separate roller assemblies.

In another embodiment, three appendages extend from each frame element radially from the channel axis. Each appendage may carry three axle rods mounting two rollers each, for six rollers per frame element, and a total of eighteen rollers for the compound roller assembly.

A method is provided for reducing friction between a hose and a supporting surface when moving the hose, comprising placing the primary roller assembly over the hose with the channel axis in the direction of an axis of the hose. Appendages may extend from the frame element radially outward from the first frame element and a plurality of axle rods engaged with the appendages, the axle rods having axes at right angles to the channel axis, and rollers having central bores, engaged with the axle rods, enabling the rollers to roll on the axle rods, over a hose at a specific position, aligning the channel axis and the hose axis. Next, the secondary roller assembly is placed over the hose extending the opening from the central channel in a direction other than the direction of the first opening.

The second end of the primary roller assembly is then joined securely to a compatible mechanical interface at the first end of the secondary roller assembly, such that the compound roller assembly is formed encompassing the hose. A plurality of compound rollers may then be formed and placed at a plurality of spaced-apart positions along a length of the hose. Said compound roller may further include all of the structural additions listed above.

DETAILED DESCRIPTION OF THE INVENTION

Figure 1:
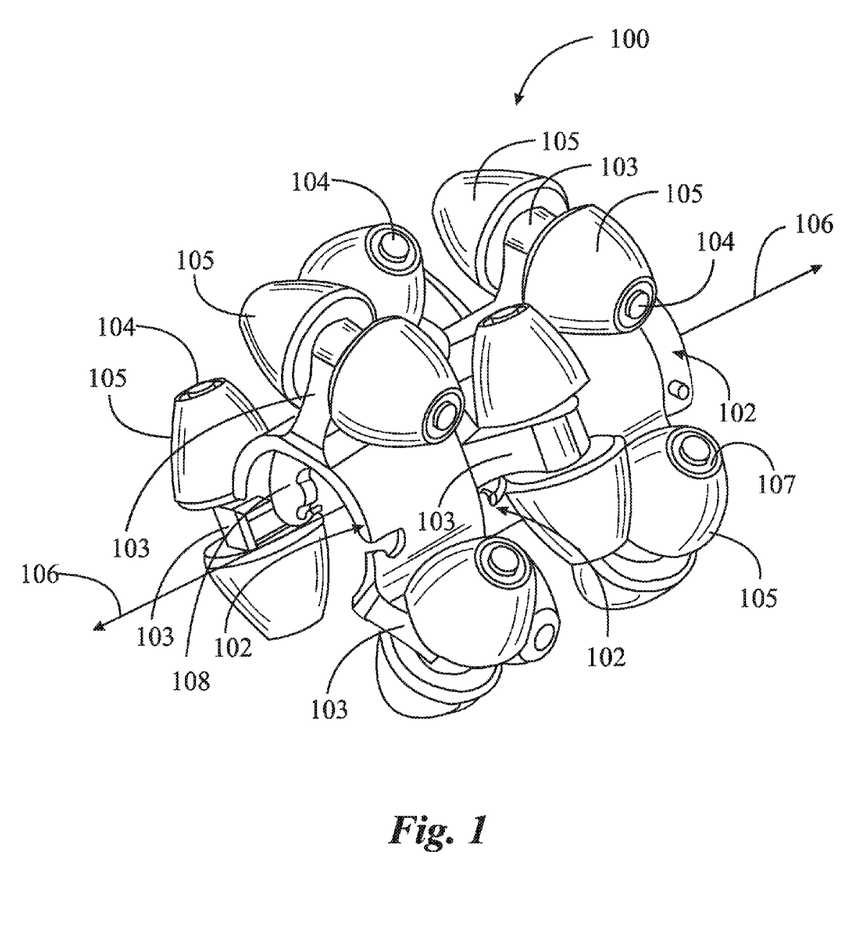
FIG. 1 is a perspective view of a roller assembly providing roller support for a hose or conduit in one embodiment of the invention.

FIG. 1 is a perspective view of a roller assembly 100 providing roller support for a hose or conduit in one embodiment of the invention, a plurality of such assemblies, attached to and spaced apart along a length of a hose or conduit, enabling the hose or conduit to move easily over any supporting surface, or around or over any restraining obstacle. Roller assembly 100 comprises, in this implementation, three connected bases 102, connected in a manner that they may entrain a hose along an axis direction 106, each base 102 having three appendages 103, each appendage 103 providing a bore mounting an axle rod 104, with each axle rod 104 providing a mount for two rollers 105, one on each side of the appendage 104. This arrangement provides a total of eighteen rollers, facing in different directions, such that a plurality of rollers will be in contact with any supporting surface or obstacle at any point in time.

In FIG. 1 not every instance of every element is provided with an element number and a witness line, for to do so would obstruct the understanding of the figure, but the skilled person will realize the repetition of elements.

Figure 2:
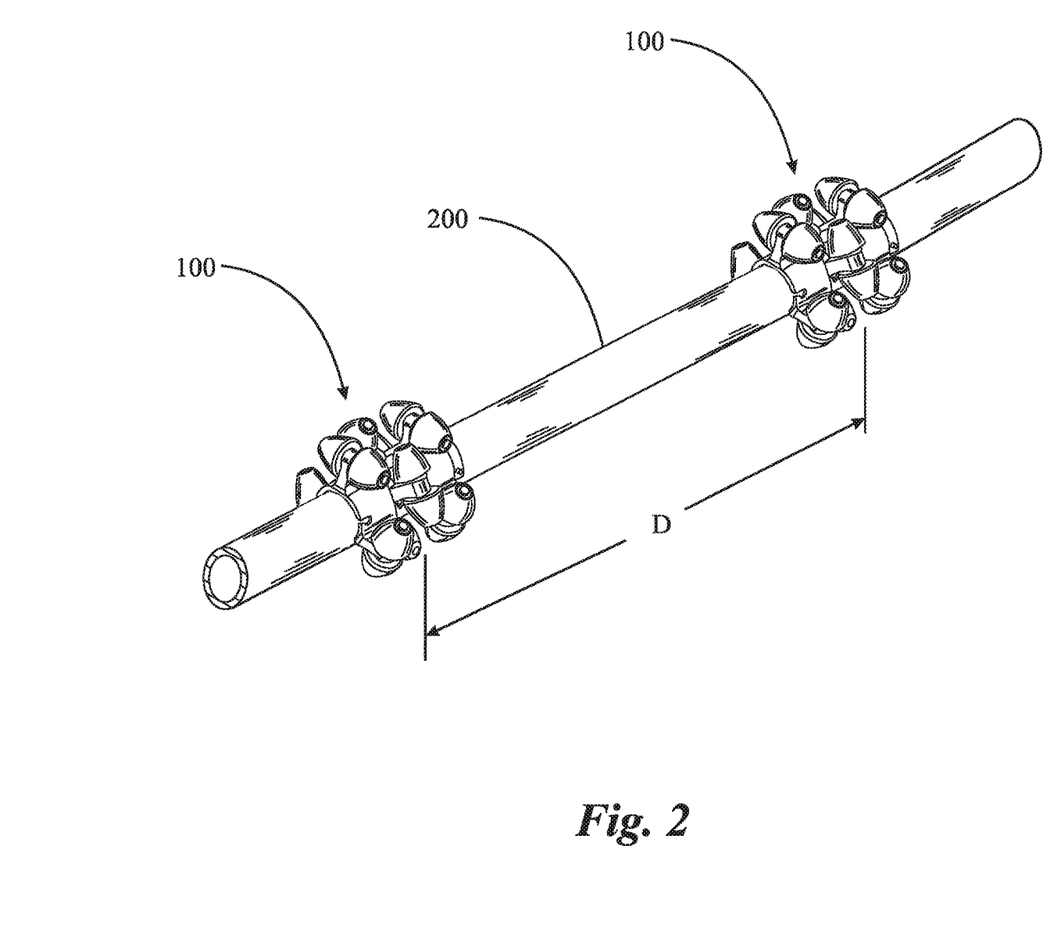
FIG. 2 is a perspective view of two roller assemblies carrying a hose in an embodiment of the invention.

FIG. 2 is an exemplary view of a relatively short section of a hose 200, upon which two roller assemblies 100 have been entrained, spaced apart by an arbitrary distance D along a length of the hose. This arrangement is exemplary of a minimum implementation of the invention. In practice a practical hose in use in an embodiment of the invention might have a considerable plurality of roller assemblies spaced along the length of the hose. The spacing is also a matter of specific use, as the necessary spacing to carry the weight of a hose, and to operate to move the hose in a relatively frictionless manner across supporting surfaces, such as bare earth, grass, gravel, concrete driveways, wooden decks, and the like, may well be a function of the size and weight of the hose, and also nature of the supporting surface and any obstacles to movement of the hose.

The skilled person will realize that weight of the hose is primarily supported in part by each of the roller assemblies, and that the dimensions of elements of the roller assembly is dependent, at least in part, on the size and material of the hose, or other conduit that may be carried by roller elements in embodiments of the invention.

Figure 3:
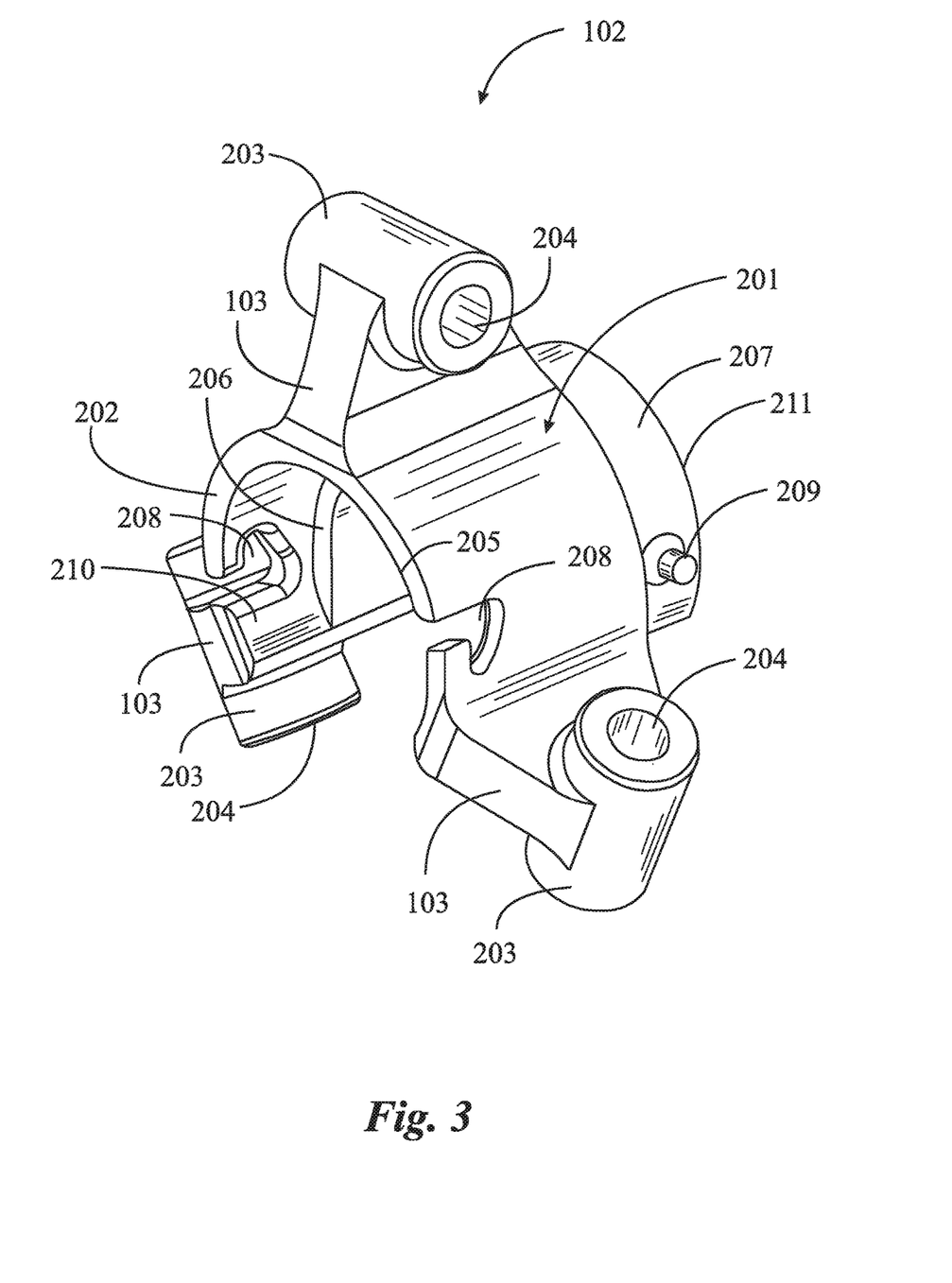
FIG. 3 is a perspective view of a single frame element in the roller assembly of FIG. 1.

FIG. 3 is a perspective view of a single frame element 102 in the roller assembly of FIG. 1. Frame element 102 comprises a partially circular body 201, open on one side, which may be placed over a hose or conduit. Body 201 has three appendages 103, spaced around the circular body in sixty-degree intervals, that each terminates on an axle-mounting element 203 having a bore 204 that has an axis that is orthogonal to a lengthwise axis of the circular body.

Circular body 201 has a female end 202 having an inner diameter 205, and a male end 207 having an outer diameter that provides a slip fit with the inner diameter of the female end, such that two such frame elements may be joined in part by engaging the male end of one into the female end of the other, aligning the two along the lengthwise axis of each. There is a shoulder 206 that serves to limit the degree of engagement of one frame element with a next frame element. Pins 209 are provided on the male end (one visible in FIG. 3), and locking grooves 208 are provided on the female end, through sidewalls of the circular body, such that, as one element is engaged in a next element in line, a rotation serves to lock the one to the other. Assembly of multiple frame elements to one another to provide a roller assembly, and engagement of the assembly to a hose or other conduit in the assembly process is described below in enabling detail.

A frame element 102 in one embodiment of the invention is an injection-molded element machine finished in some aspects. For example, it is typical of injection-molded objects like frame element 102, for some molding flash to be removed, which may be done manually, or may be done by tumbling a quantity of molded elements in barrels filled with abrasive material. In some cases further tumbling may be implemented to polish the outer surfaces of the molded elements. Finished frame elements may have bores 204 finished to size by a boring tool. In alternative embodiments such frame elements may be die cast, and finished, or may be assembled from other elements.

Figures 4, 5, 6A, 6B:
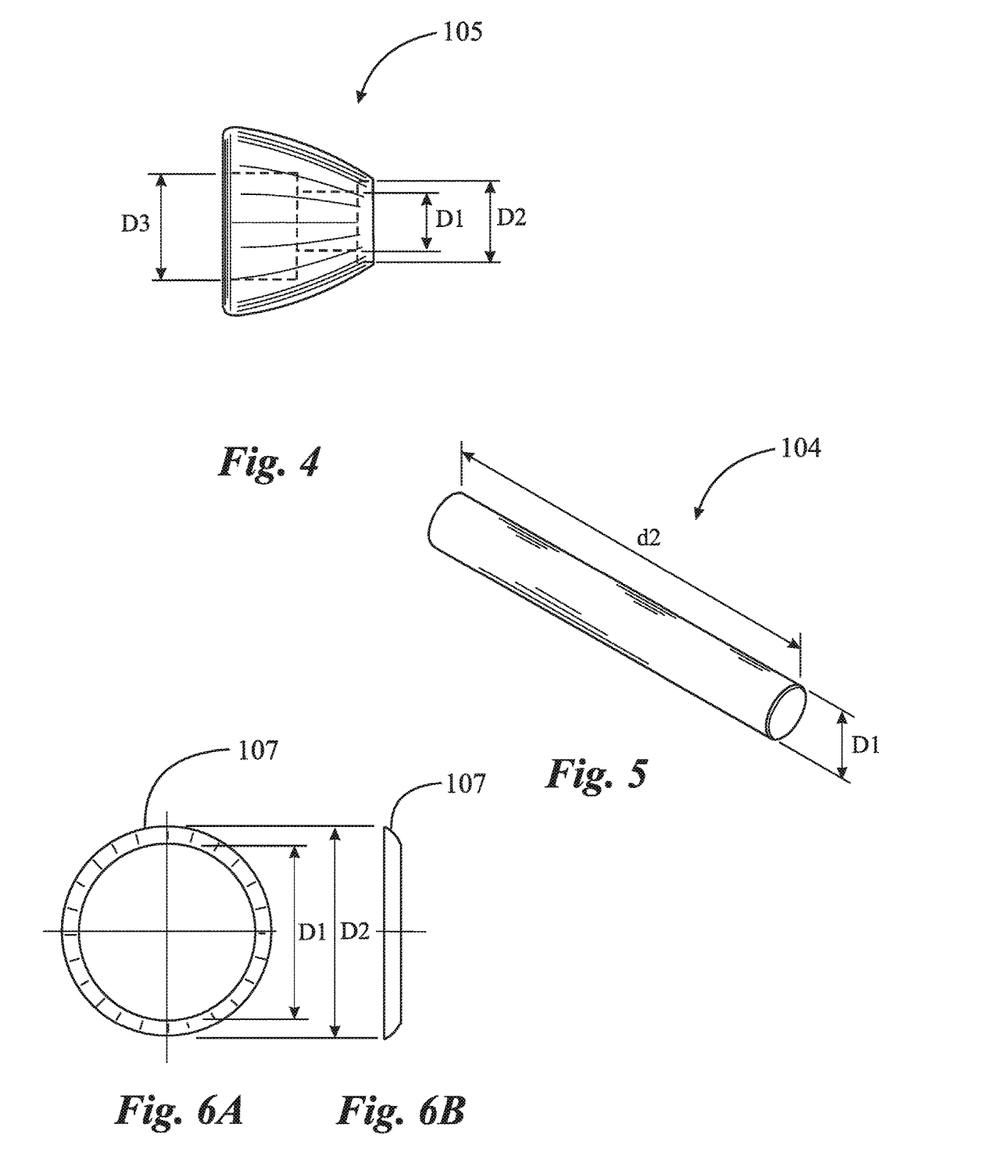
FIG. 4 is a side elevation view of a single roller of the roller assembly of FIG. 1.
FIG. 5 is a perspective view of an axle rod from the roller assembly of FIG. 1.
FIG. 6A is a face-on view of a retainer element from the roller assembly of FIG. 1.
FIG. 6B is a side view, in section, of the retainer element of FIG. 1.

FIG. 4 is a side elevation view of a single roller 105 of the roller assembly of FIG. 1. There are six of these rollers on a single frame element, and eighteen on a roller assembly combining three frame elements. Roller 105 in one embodiment is approximately cone-shaped, as shown, and may be injection molded, and machine finished. Material in one embodiment may be high-density polymer material, which has a very high coefficient for wear. In other embodiments the rollers may be machined from metal or plastic, and then coated with a high-density polymer to provide the desired wear characteristics.

In one embodiment roller 105 has a through bore of diameter D1, which is controlled to be a slip fit to an axle rod described below. The roller in use must rotate on the axle rod. A counter-bore of diameter D3 from a larger end is of a dimension to fit over the outside diameter of mounting element 203 at the end of each of appendages 103 of frame element 102. Another counter-bore at the smaller end of the roller, of diameter D2, is provided to accommodate a cinching collar described below, to hold the roller on the axle rod. Alternatively, another embodiment may include a type of barrel nut or barrel bolt which is a fastener nut which includes a barrel-shaped flange at on end with a protruding boss that is internally threaded.

FIG. 5 is a perspective view of axle rod 104 of FIG. 1, which is of a length d2 sufficient to pass through bore 204 of mounting element 203 at the end of appendage 103, to engage two rollers 105, one on each side of each mounting element at the end of each appendage 103 of a frame element. The rollers are provided to rotate mainly on axle rod 104 by bore diameter D1. The axle rods in one embodiment are surface-hardened steel, and may be ground to final diameter.

FIG. 6A is a face-on view of a single cinching collar 107, and FIG. 6B is a side view of the cinching collar. This collar, in one embodiment is a commercially available element known in the art for performing the function of retaining elements on a shaft in assembly. The inside diameter D1 is actually a bit smaller than diameter D1 of the axle rod, so the cinching collar may be pressed onto the axle rod in assembly, and will hold the rollers in place. The outside diameter D2 of the cinching collar fits into the counter-bore D2 of the wheel in assembly.

Figure 7:
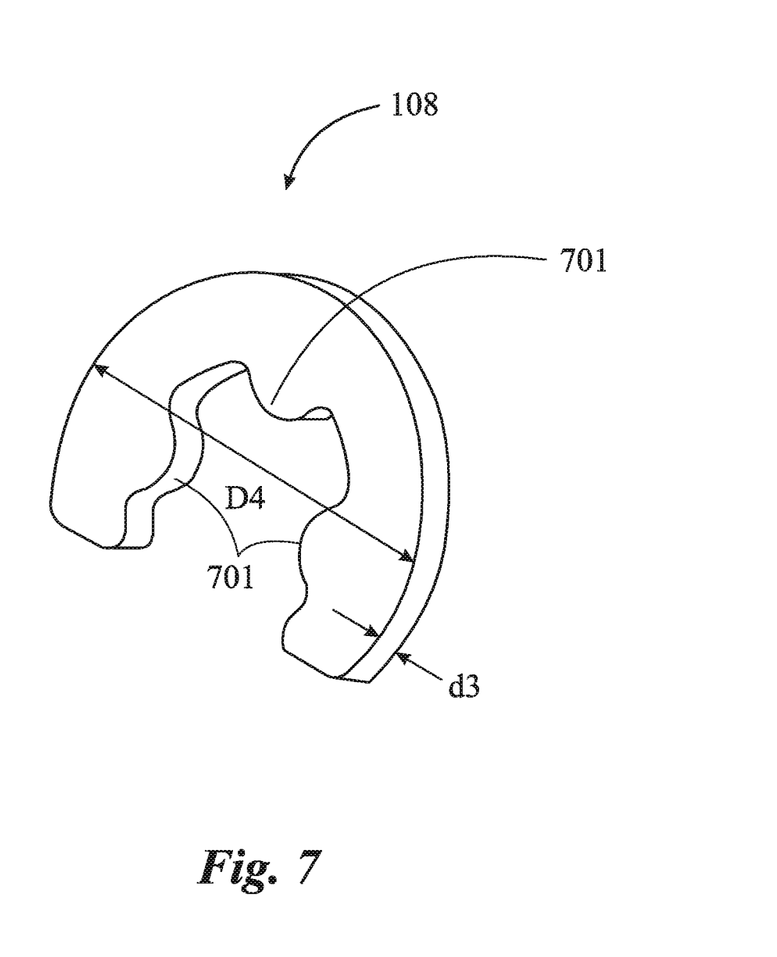
FIG. 7 is a perspective view of an assembly gasket from the roller assembly of FIG. 1.

FIG. 7 is a perspective view of an assembly gasket 108 from the roller assembly of FIG. 1. Referring now to FIG. 3, frame element 102 has shoulder 206 as a limit in female end 202. In assembly of one frame element to another, gasket 108 is placed against shoulder 206, such that an end of the male end of another frame element will contact this gasket in assembly. Thickness d3 of gasket 108 is provided such that the gasket is compressed somewhat to align posts 209 with locking grooves 208, so as the frame elements are rotated in locking, the gasket provides a force against the locking grooves, that keeps the frame elements locked together. Gasket 108 has additional features 701 that engage a hose or conduit in a manner that the hose or conduit is gripped securely, even though there may be differences in diameter between individual hoses or conduits.

In an alternative embodiment the gasket is reconfigured as a hose retainer wherein, the gasket is formed in two identical halves that partially insert through slots formed between the appendages 103 of circular bore 102. Each half may include an inward extended round protrusion through the slots of differing sizes to accommodate engagement with hoses having different diameters. The halves may be inserted from outside of circular body 102 or from inside. The slots may be formed as extensions from grooves 208 of a length to accommodate the halves, or portions of the halves.

Figure 8:
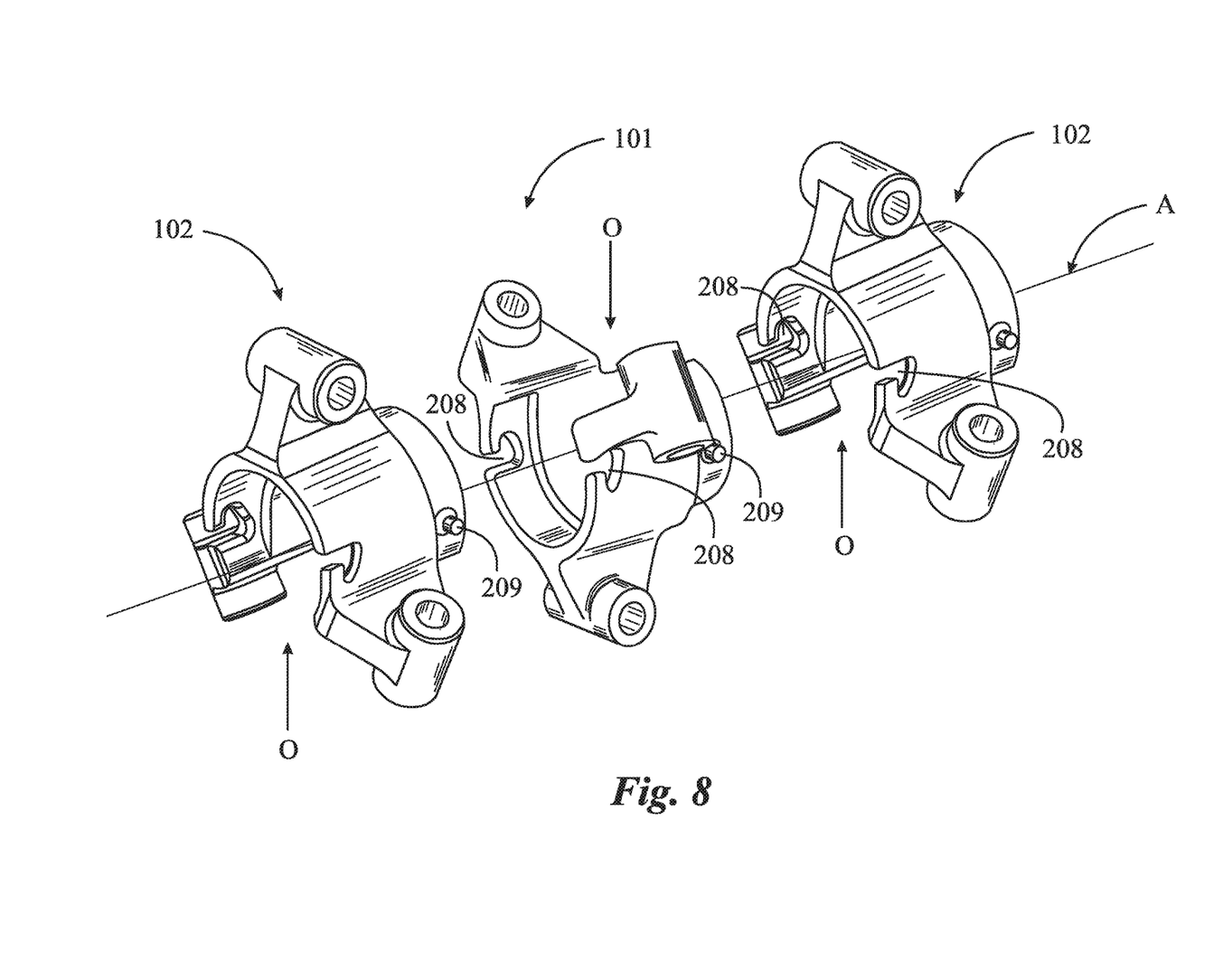
FIG. 8 is a perspective view of three frame elements aligned for assembly in an embodiment of the invention.

FIG. 8 is a perspective view of three frame elements 102 aligned for assembly to a hose or a conduit in an embodiment of the invention. The frame elements are identical. The only difference is that the frame elements on each end of the row of three are open from below, and the middle frame element is open from the top. The middle frame element is simply rotated 180 degrees around axis A, which is the axis of a hose or conduit to which the three frame elements may be engaged as assembles into a roller assembly, as shown in FIG. 1. Axle rods and rollers are not shown in FIG. 8, so the frame elements may better illustrate the relationship between the elements.

To engage one roller assembly 100 at one position along a hose or conduit, as may be seen in FIG. 2, a user will place one frame element 102, complete with axle rods and rollers, over the hose or conduit. This first frame element (furthest left in FIG. 8) will not securely engage the hose or conduit. The user will then place a second frame element, the middle element in FIG. 8, in place over the hose or conduit, rotated 180 degrees around axis A, next to the first element placed over the hose. A gasket 108 is placed in the second (middle) frame element, against shoulder 206 (see FIG. 3). The two frame elements are brought together along axis A, with the male end of the second frame element engaging the female end of the first frame element. Pins 209 of the first frame element engage the locking grooves 208 of the second frame element, requiring some force against gasket 108 to twist and engage, and when released, the gasket keeps the pins and locking grooves engaged.

Referring now to FIG. 7, illustrating gasket 108, projections 701 serve a function of compressing against the hose or conduit that is the object of the roller assembly, and enable roller assemblies of one size to be used with hoses and conduits of a variation in diameter. It will be apparent to the skilled person that a roller assembly comprising two frame elements with axles and rollers will be relatively stable on a hose or conduit, and could be used to practice the invention, but that the roller assembly with three frame elements is more stable, and may be preferred.

It will be apparent to the skilled person that there may be a variety of ways to provide rollers on frames engaged with hoses or conduits, to reduce or eliminate friction in pulling the hoses or conduits over supporting surfaces, and that the very specific assembly of parts described in enabling detail above, is but one example of an mechanical assembly that will accomplish the purpose. Further, there may be many alterations in dimensions and materials, as well, other than the dimensions and materials indicated in examples thus far. The invention is thus limited only by the claims that follow.

The invention claimed is:

1. A compound roller assembly for carrying a hose or conduit having a first diameter, comprising:
   a primary roller assembly comprising;
   a first frame element having a length between a first end and a second end;
   a central channel with a channel axis, the central channel of a diameter equal to or larger than the first diameter to enclose a portion of the hose or conduit, the central channel having an opening of a width at least equal to the first diameter and extending to one side, enabled to be placed over the hose or conduit with the channel axis in the direction of an axis of the hose or conduit;
   appendages that extend from the first frame element radially outward from the first frame element;
   a plurality of axle rods engaged with the appendages, the axle rods having axes at right angles to the channel axis, and rollers having central bores, engaged with the axle rods, wherein the rollers roll on the axle rods; and
   a secondary roller assembly identical to the primary roller assembly except for position and orientation, the secondary roller assembly placed over the hose or conduit with the secondary roller assembly rotated around the central axis, the opening extended from the central channel in a direction other than the direction of the first opening, the second end of the primary roller assembly joined by a mechanical interface securely to a compatible mechanical interface, to the first end of the secondary roller assembly, such that the compound roller assembly encompasses the hose.

2. The compound roller assembly of claim 1, wherein the first end is a female end and the second end is a male end, the female end of an inside diameter to accept an outside diameter of the male end up to a shoulder in the female end, and the mechanical interfaces comprise one or more pins extending radially from the outside diameter of the male end, and locking grooves implemented in the female end to accept the pins and to lock with a rotary motion engaging the pins in the grooves.

3. The compound roller assembly of claim 2 further comprising a gasket having a central channel of a diameter over the hose between the second end of the primary roller assembly and the first end of the secondary roller assembly, the gasket made of a material compressed in assembly which urge the primary and secondary roller assemblies apart, thereby securing locking of the pins in the grooves.

4. The compound roller assembly of claim 1 wherein the rollers are polymer rollers having a conical shape in length-wise cross-section.

5. The compound roller assembly of claim 3 wherein the gasket has a central channel with a channel axis, the central channel of a diameter equal to or larger than the first diameter to enclose a portion of the hose, the central channel having an opening of a width at least equal to the first diameter and extending to one side, which is placed over the hose or conduit with the channel axis in the direction of an axis of the hose or conduit.

6. The compound roller assembly of claim 5 wherein the gasket has a plurality of inward extending appendages from the central channel that grip the hose, wherein the compound roller assembly is applied to hoses of different diameters.

7. The compound roller assembly of claim 1 further comprising a tertiary roller assembly identical to the primary and secondary roller assemblies, placed over the hose or conduit with the tertiary roller assembly engaging the hose in the same aspect as the primary roller assembly, the first end of the tertiary roller assembly joining, by the mechanical interface, securely to the compatible mechanical interface to the second end of the secondary roller assembly, such that the compound roller assembly encompasses the hose.

8. The compound roller assembly of claim 7 comprising three appendages extending from each frame element radially from the channel axis, each appendage carrying three axle rods mounting two rollers each, for six rollers per frame element, and a total of eighteen rollers for the compound roller assembly.

9. A method for reducing friction between a hose and a supporting surface when moving the hose, comprising:
placing a primary roller assembly having a first frame element having a length between a first and a second end, a central channel with a channel axis, the central channel of a diameter equal to or larger than the first diameter, enclosing a portion of the hose, the central channel having an opening of a width at least equal to the first diameter and extending to one side, allowing placement over the hose with the channel axis in the direction of an axis of the hose, appendages extending from the frame element radially outward from the first frame element, a plurality of axle rods engaged with the appendages, the axle rods having axes at right angles to the channel axis, and rollers having central bores, engaged with the axle rods, enabling the rollers to roll on the axle rods, over a hose at a specific position, aligning the channel axis and the hose axis;
placing a secondary roller assembly identical to the primary roller assembly except for position and orientation, over the hose or conduit with the secondary roller assembly rotated around the central axis, extending the opening from the central channel in a direction other than the direction of the first opening;
joining, the second end of the primary roller assembly by a mechanical interface, securely to a compatible mechanical interface at the first end of the secondary roller assembly, such that the compound roller assembly encompasses the hose; and
placing and assembling primary and secondary roller assemblies as compound roller assemblies at a plurality of spaced-apart positions along a length of the hose.

10. The method for reducing friction of claim 9, wherein the first end of the first frame element is a female end and the second end is a male end, the female end of an inside diameter to accept an outside diameter of the male end up to a shoulder in the female end, and the mechanical interfaces comprise one or more pins extending radially from the outside diameter of the male and, and locking grooves implemented in the female end to accept the pins and to lock with a rotary motion.

11. The method of reducing friction of claim 10 further comprising placing a gasket having a central channel of a diameter over the hose between the second end of the primary roller assembly and the first end of the secondary roller assembly, the gasket made of a material enabling depression in assembly, urging the primary and secondary roller assemblies apart, securing locking of the pins in the grooves.

12. The method of reducing friction of claim 9 wherein the rollers are polymer rollers having a conical shape in length-wise cross-section.

13. The method of reducing friction of claim 11 wherein the gasket has a central channel with a channel axis, the central channel of a diameter equal to or larger than the first diameter to enclose a portion of the hose, the central channel having an opening of a width at least equal to the first diameter and extending to one side, allowing placement over the hose or conduit with the channel axis in the direction of an axis of the hose or conduit.

14. The method of reducing friction of claim 13 wherein the gasket has a plurality of inward extending appendages from the central channel, gripping the hose, and enabling the compound roller assembly to be applied to hoses of different diameters.

15. The method of reducing friction of claim 9 further comprising placing a tertiary roller assembly identical to the primary and secondary roller assemblies, over the hose or conduit with the tertiary roller assembly engaging the hose in the same aspect as the primary roller assembly, and joining the first end of the tertiary roller assembly by a mechanical interface securely to a compatible mechanical interface to the second end of the secondary roller assembly, such that the compound roller assembly encompasses the hose, providing a compound roller assembly comprising three separate roller assemblies.

16. The method of reducing friction of claim 15 comprising three appendages extending from each frame element radially from the channel axis, each appendage carrying three axle rods mounting two rollers each, for six rollers per frame element, and a total of eighteen rollers for the compound roller assembly.

* * * * *